United States Patent

Sergo, Jr.

[15] 3,668,691

[45] June 6, 1972

[54] ANALOG TO DIGITAL ENCODER

[72] Inventor: John Robert Sergo, Jr., Matawan, N.J.

[73] Assignee: Bell Telephone Laboratories, Incorporated, Murray Hill, N.J.

[22] Filed: Aug. 12, 1970

[21] Appl. No.: 63,171

[52] U.S. Cl. ..................................340/347 AD, 179/15 AV

[51] Int. Cl. ........................................................H03k 13/02

[58] Field of Search..................340/347; 179/15, 55, 15 AV; 324/99; 235/92; 325/38, 141; 332/11

[56] References Cited

UNITED STATES PATENTS

| | | | |
|---|---|---|---|
| 3,349,390 | 10/1967 | Glassman | 340/347 |
| 3,488,652 | 1/1970 | Huelsman | 340/347 |
| 3,532,864 | 10/1970 | Dertouzos | 340/347 X |

*Primary Examiner*—Thomas A. Robinson
*Assistant Examiner*—Charles D. Miller
*Attorney*—R. J. Guenther and E. W. Adams, Jr.

[57] ABSTRACT

An encoder employing level elimination companding for higher level input signals wherein a progressively increasing number of quantum levels are eliminated between selected levels with the number of levels eliminated increasing by one for each level selected during the companding phase.

4 Claims, 1 Drawing Figure

PATENTED JUN 6 1972 3,668,691
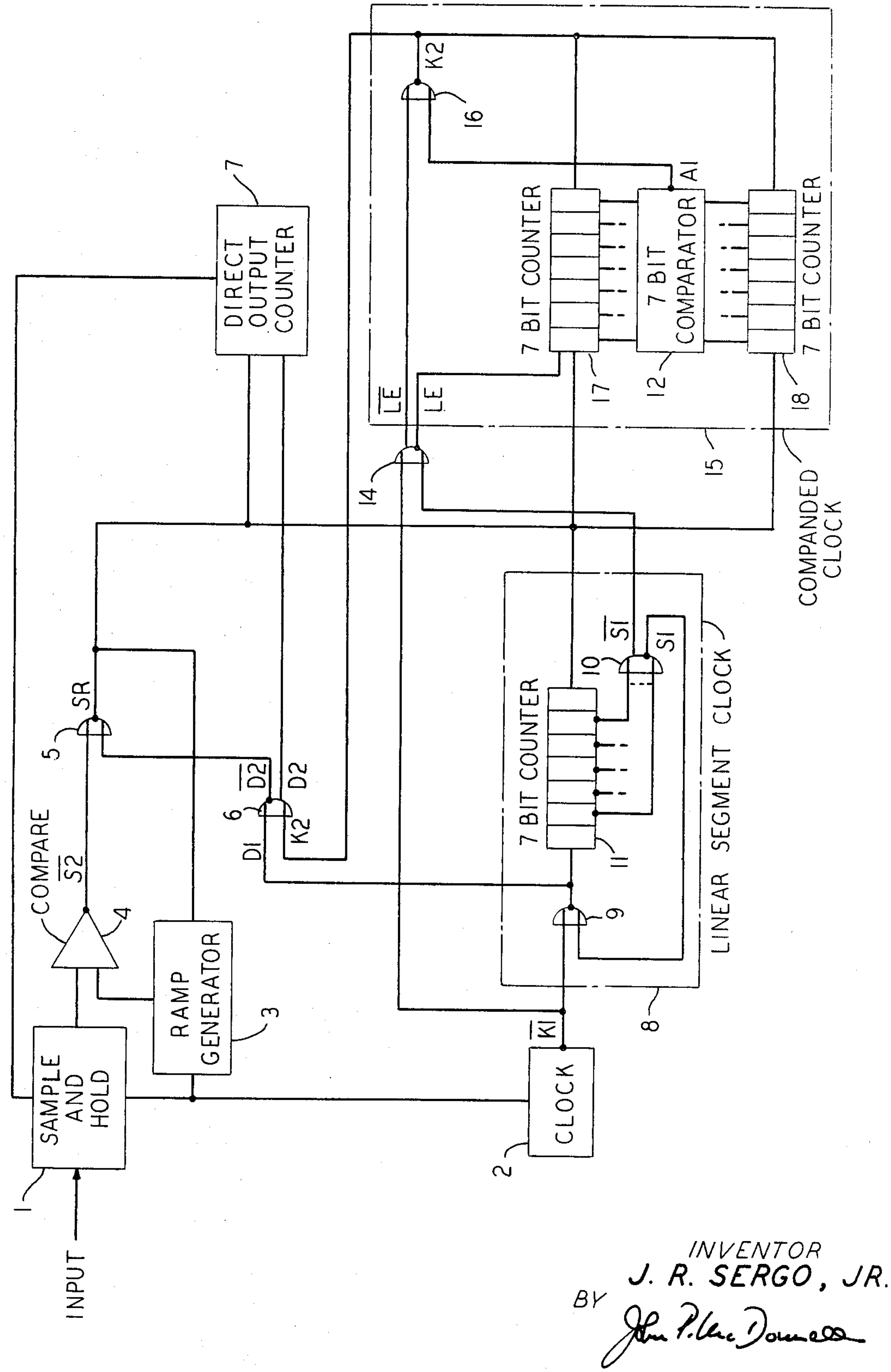
INVENTOR
J. R. SERGO, JR.
BY [signature]
ATTORNEY

ANALOG TO DIGITAL ENCODER

BACKGROUND OF THE INVENTION

This invention relates to digital information processing systems and, more particularly, to systems for translating analog signal amplitudes into representative binary words.

In PCM (pulse code modulation) communication systems, continuous time varying information signals, such as electrical speech signals, may be represented by a series of ON and OFF pulses. In this process, the signal is periodically sampled, quantized, and encoded into binary code words indicative of the amplitude of each of the samples. In the quantizing process, the exact level of the time varying input signal at any instant is approximated by one of a number of discrete values called quantum levels. The difference between the instantaneous value of the input signal and the quantum level actually transmitted is called quantizing error and gives rise to what is known variously as quantizing noise or quantizing distortion.

Quantizing distortion is especially objectionable and very often intolerable when the instantaneous value or magnitude of the input signal is small, but is usually of little or no significance when the instantaneous magnitude of the input signal is high. For higher quality and more effective transmission, it is therefore desirable to have more samples of the lower amplitudes of the input signal and relatively less samples at the higher amplitudes of the input signal. This non-linear redistribution of the total number of samples available is called "companding," a verbal contraction of the terms "compression" and "expanding." Companding, therefore, balances the undesirable effects of quantizing error by reducing the magnitude of the quantizing error for low amplitude input signals where quantizing distortion would be a serious matter at the price of increased quantizing error for higher amplitude signals where increased distortion can be tolerated. Restated, the purpose of the PCM compandor is to reduce the quantizing impairment of the original signal by quantizing on a non-uniform or non-linear, rather than a uniform or linear, basis.

Sequential companding on a non-linear basis may be obtained by the level elimination process where the number of quantization levels decreases either linearly or exponentially with increasing input signal amplitude. The linear level elimination process provides a satisfactory companding characteristic for higher level input signals but is just barely adequate for lower level signals. Although the companding characteristic for lower level signals could be readily improved to meet modern transmission system requirements with logic circuitry having higher speeds, the required logic speed is not obtainable at the present state of the art. The logic speeds required are readily appreciated once it is remembered that these networks normally take the input signal and encode it into 13 or 14 bits which are then fed into further processing circuitry which includes a storage device, shift register, or comparable equipment, and a counter. The 13 or 14-bit word is then reprocessed down to an eight-bit companded word. The entire process also requires relatively large and complex, hence expensive, transmitters and receivers.

The exponential level elimination companding process does not require unobtainable logic speeds to meet modern transmission system requirements but suffers from the disadvantages that it requires large and complex, hence expensive, transmitters, receivers, and associated circuitry to prevent the exponentially increasing mode of operation from damaging or destroying the circuitry. Both the linear and exponential level elimination processes require the use of analog circuitry which introduces non-linear errors which are difficult to either compensate for or eliminate. The companding characteristic of these circuits are also relatively inflexible, a disadvantage where a single design is to be used for various applications.

The cost of these encoders, in common with the cost of encoders in general, is burdensome in transmission systems where the lines are not synchronous. Since the lines are not synchronous, the coder cannot be shared without the use of gating, timing, and buffering equipment which increases the cost of the overall encoder. The alternative of supplying individual coders for each line in the system is equally undesirable from a cost standpoint.

It is, therefore, an object of this invention to provide a simple and inexpensive PCM encoder with level elimination companding wherein the encoded word is directly fed into the output counter to form directly the output word in standard binary form.

It is a further object of this invention to provide such an encoder which requires only relatively low speed logic employing essentially all-digital circuitry and has an adjustable companding characteristic.

SUMMARY OF THE INVENTION

The encoder of the present invention has a two-chord companding characteristic with a linear segment and a companded level elimination segment. Quantization levels corresponding to the lower levels or magnitudes of the input signal are provided at a linear rate until a predetermined number of encoder clock pulses are counted by a linear segment clock. Each of the encoder clock pulses to the linear segment clock is, in turn, fed to an output counter to form directly an output code word in standard binary form. Once the predetermined number of clock pulses is counted without the magnitude of the input signal exceeding the magnitude of the ramp reference signal, the encoder clock pulses are no longer fed to the linear segment clock but are instead fed to a companded clock. The companded clock provides a pulse output to the output counter at a preselected variable rate which progressively decreases with respect to the rate of pulses supplied by the encoder clock. The number of encoder clock pulses in the interval between output pulses from the companded clock is equal to the number of pulses previously transmitted from the companded clock for the binary word being directly formed in the output register.

For example, if 62 were to be chosen as the predetermined number of linear chord pulses, then each of the first 62 pulses would be transmitted from the encoder clock through the linear segment clock to the output counter. A pulse corresponding to the 63rd clock pulse would be transmitted to the companded clock which in turn would transmit an output pulse corresponding to this pulse to the output counter. The 64th encoder clock pulse would be "skipped" by the companded clock and a pulse corresponding to the 65the encoder clock pulse would be transmitted to the output counter. Next, the 66th and 67th encoder clock pulses would be "skipped" by the companded clock and a pulse corresponding to the 68th encoder clock pulse would be transmitted to the output counter. The next encoder clock pulse delivered to the output counter would "skip" the 69th, 70th, and 71st clock pulses, and so on, until the magnitude of the reference signal exceeds or is equal to the magnitude of the input signal.

Thus, the encoder of the present invention quantizes lower level input signals linearly where quantizing error results in serious impairment and uses level elimination with a progressively increasing number of levels eliminated as the magnitude of the input signal grows larger and increased distortion can be tolerated. It should be noted that the companding is done directly in essentially an all-digital fashion with the output code word being directly registered in a standard binary code. Only relatively low speed logic is required and the prior art needed for storage devices, shift registers, or corresponding equipments is eliminated. The overall cost of the encoder is appreciably reduced to the point where the use of individual encoders for each of the lines in a transmission system where the lines are not synchronous is no longer unattractive from a cost standpoint.

BRIEF DESCRIPTION OF THE DRAWING

Other objects and features of the present invention will readily be apparent from the following discussion and drawing, the single FIGURE of the drawing being a block diagram of an encoder embodying the present invention.

DETAILED DESCRIPTION

As can be seen from the single figure of the drawing, the input signal is applied to the sample and hold network 1. The sample and hold network 1 is connected to the encoded clock 2 and the ramp reference generator 3. Both the sample and hold network 1 and the ramp generator 3 are connected to individual inputs to the comparator 4. Each of the gates illustrated in the drawing is a NOR gate having a logical "1" from the "dotted" output of the gate symbol whenever logical "0's" are present at each of the gate input leads. The "non-dotted" output of a gate indicates that the NOR gate has an additional output which is an OR complement of the "dotted" NOR output, i.e., has a complementary logical "0" output when the gate output is a logical "1" and a complementary logical "1" output when the gate output is a logical "0". Each of these "non-dotted" outputs will be referred to hereinafter as the complementary output of its related gate, while the "dotted" output will be referred to as the output of the related gate.

One input of gate 5 is connected to the output of gate 6 while the second input of gate 5 is connected to the output of the comparator 4. The complementary output of gate 6 is connected to the direct output counter 7. The sample and hold network 1 is also connected to the output counter 7 to provide an indication of the polarity of the sample. The output of gate 5 is connected to the ramp generator 3, the direct output counter 7, and the counters in the linear segment clock 8 and the companded clock 15.

The linear segment clock 8 comprises gates 9 and 10 and the seven-bit counter 11. The output of gate 10 is connected to one of the inputs of gate 9. The output of gate 9 is connected to the counter 11 and to one input of gate 6. The "dotted" outputs of the encoder clock 2, counter 11, and the seven-bit comparator 12 in the companded clock indicates that the respective pulse outputs of these equipments are a logical "0's" at their output terminals, as discussed in detail hereinafter. For example, in the case of the seven-bit counter 11, when a logical "1" appears in a given cell, then the output to the gate 10 for that cell will be a logical "0". The "dotted" output of the clock 2 is connected to one input of the gate 9 and to one input of the gate 14. The complementary output of gate 10 is connected to the second input of gate 14.

The companded clock 15 comprises a gate 16, seven-bit counters 17 and 18, and a seven-bit comparator 12. The output of gate 14 is connected to the seven-bit counter 17, while the complementary output of gate 14 is connected to an input of gate 16. The "dotted" output of seven-bit comparator 12 is connected to the other input of gate 16. The outputs of each cell of the seven-bit counters 17 and 18 are connected to the inputs to the seven-bit comparator 12. The output of gate 16 is connected to the seven-bit counters 17 and 18 and to an input of gate 6. The stop/reset SR output of gate 5 is connected to the ramp reference generator 3 and each of the counters 11, 17, and 18 to reset these equipments whenever the magnitude of the reference signal is equal to, or exceeds, the magnitude of the sample of the input signal. Each of the logic blocks illustrated in the drawing is believed to be sufficiently well-known in the art to forego a detailed description of this equipment. Any one of a number of compatible components which are readily available commercially may be used for each of the blocks shown in the drawing.

As noted heretofore, the encoder of the present invention is a two-chord encoder with one segment or chord of the companding characteristic (input signal amplitude vs. number of quantization level) encompassing a predetermined number of levels, the latter number of which may be varied to suit any given application as discussed hereinafter. The linear (no level elimination-each level taken) chord or segment of the companding characteristic is determined by the linear segment clock 8 and insures that sufficient levels are taken at the lower levels of the input signal to prevent quantizing errors which may introduce serious transmission impairments, as discussed heretofore. After a predetermined number of levels, encoder clock 2 pulses are no longer applied to the linear segment clock 8 and, instead, are applied to the counter of the companded clock 15. The companded clock 15 progressively "-skips" $n$ clock pulses between the $n$ and $n+1$ output companded pulses, as also discussed in detail hereinafter. The companding characteristic of this second chord is, therefore, non-linear. The overall companding characteristic thus has a linear chord for lower level input signals and a non-linear chord for signal levels of increasing magnitude. The operation of the encoder will now be discussed in detail.

The sample and hold network 1 samples the magnitude of the input signal at intervals determined by the desired sampling rate and holds them until the cycle of the reference signal generated by the reference generator 3 is completed. As can be seen from the drawing, a ramp generator 3 may be advantageously employed as the reference generator in the present encoder. Other function generators employing different waveforms could also be used as reference sources in the manner well-known in the art. Except for the ramp generator 3, which is most simply implemented by an analog circuit, the remainder of the present encoder employs all-digital circuitry. If desired, of course, digital circuitry could be employed in place of the analog ramp generator. Use of a ramp as a reference function has the advantage that if in a non-synchronous transmission system the ramp generated at the receiver is off either in slope or starting point from the ramp generated at the transmitter, only linear magnitude distortion, which does not interfere with either the tone or quality of the signal, is introduced.

As noted heretofore, the linear segment clock initially counts the encoder clock 2 pulses until a predetermined count has been registered in counter 11. For applications where the input signal is a speech signal, the predetermined count of 62 has been found to yield a transmission characteristic which approaches an ideal characteristic. This predetermined number or count is quite flexible and can be adjusted simply by adjusting the counter 11. This ease of adjustment of the point at which the linear and non-linear chords of the companding characteristic intersect is a principle advantage of the present invention.

Prior to the counter 11 reaching the predetermined number of pulses, each logical "0" clock pulse appearing at the "dotted" output $\overline{K1}$ of the encoder clock 2 is applied to an input of the gate 9 and to an input to the gate 14. The output of the gate 10, designated S1 in the drawing, is connected to the other input of gate 9. The complementary output of gate 10, designated $\overline{S1}$ in the drawing, is connected to the other input of gate 14. Gates 9 and 14 determine whether the logical "0" pulses from the encoder clock 2 pass through gate 9 or gate 14. When the S1 output of gate 10 is a logical "0", its complementary output $\overline{S1}$ will be a logical "1", and the logical "0" encoder clock 2 pulses $\overline{K1}$ will pass through gate 9 rather than gate 14. The logical "1" output pulses of gate 9 in response to the logical "0" $\overline{K1}$ and S1 pulses are in turn fed to an input D1 of gate 6 and to the seven-bit counter 11 where they are counted. The other input to the gate 6 is designated K2 from the output of gate 16. As discussed hereinafter, the K2 output of gate 16 will be a logical "0" for all encoder clock pulses prior to the predetermined number of encoder clock pulses. The complementary output D2 of gate 6 is fed to the direct output counter 7 which registers or counts the presence of the logical "1" D1 pulse in response to the logical "0" $\overline{K1}$ pulse input to gate 9. Thus each encoder clock pulse prior to the predetermined number of encoder clock pulses is directly fed through gates 9 and 6 to the direct output counter 7. This process will continue up to the predetermined number of pulses if the output of the comparator 4, designated as $\overline{S2}$ in the drawing, does not become a logical "0", i.e., if the reference ramp signal does not become equal to, or exceed, the magnitude of the input signal. Since the $\overline{D2}$ output of gate 6 will become a logical "0" for each encoder clock 2 logical "0" pulse, in the event the output S2 of the comparator 4 should become a logical "0", a logical "1" pulse would appear at the output SR of the gate 5 the next time a logical "0" was present at the output $\overline{D2}$ of gate 6. The logical "1" SR output is a stop/reset pulse which is applied to the ramp generator 6 and to each of the counters 11, 17, and 18 to prepare for the next sample of input signal. At the end of each sample period, the code word directly formed in the output counter 7 is transmitted and the counter 7 and encoder clock 2 are reset for the next cycle or code word.

If the magnitude of the reference signal does not equal or exceed the input signal prior to the predetermined number of clock pulses, each of the encoder clock 2 pulses will be counted in the counter 11 up to the predetermined number of pulses. When the predetermined number of clock pulses are counted, the output of each of the cells of counter 11 connected to the inputs of gate 10 will be logical "0's". When each of the inputs to gate 10 is a logical "0", a logical "1" will be present at the S1 output of gate 10 which is applied to the input of gate 9 to prevent any further encoder clock 2 pulses from passing through gate 9. The complementary $\overline{S1}$ output of gate 10 will now be a logical "0" and the logical "0" $\overline{K1}$ encoder clock 2 pulses will now pass through gate 14. It should be noted that prior to the predetermined number of encoder clock pulses being counted by counter 11, each of the pulses from the encoder clock 2 was used without any level elimination. Quantizing error for lower level signals which, as noted heretofore, introduces serious transmission impairment, is thereby reduced to a minimal value for signals of lower magnitudes.

Each logical "0" output $\overline{K1}$ from the encoder clock 2 will in the presence of a logical "0" output $\overline{S1}$ from gate 10, produce a logical "1" output $\overline{LE}$ and a complementary logical "0" output LE. The LE output of gate 14 is transmitted to the seven-bit counter 17. Each cell of counter 17 initially has a logical "0" in it while counter 18 has a logical "1" stored in its first cell and logical "0's" stored in the remaining cells. The first clock pulse from encoder clock 2, after the predetermined number of pulses, is fed to gate 14 and produces a logical "1" LE output which is counted by the first cell of the counter 17. The seven-bit comparator 12 then compares this count with the count of counter 18. Since, as noted, a logical "1" is stored in the first cell of counter 18, the counts in the cell "compare" and a logical "0" pulse is produced at the output A1 of the comparator 12 and is fed to one input of the gate 16. As noted heretofore, the $\overline{LE}$ output of the gate 14 will be a logical "0" for each encoder clock pulse, hence the presence of logical "0's" at both inputs of gate 16 produces a logical "1" K2 output. The logical "1" K2 output is transmitted to counters 17 and 18 to reset counter 17 to zero and store a "two" count in counter 18. The logical "1" K2 output is also fed to one of the inputs of gate 6. The other, or D1 input of gate 6, corresponds to the output of gate 9 and will be a logical "0" once the counter 11 has counted the predetermined number of pulses, as discussed heretofore. Each K2 pulse from gate 16 will therefore cause a logical "1" to be present at the $\overline{D2}$ output and a logical "0" to be present at the D2 output. The interaction of these outputs with the comparator 4, gage 5, and direct output register 7 are now the same as discussed heretofore in connection with the linear segment clock 8.

The next encoder clock 2 pulse producing a logical "1" LE output is also counted by counter 17 and compared by comparator 12 with the count in counter 18. Since counter 18 now has a "two" stored therein, the counts do not compare and there is no output pulse from the comparator. One encoder clock pulse is thus "skipped." The succeeding encoder clock pulse, however, now stores a "two" in counter 17, the counts in counters 17 and 18 compare, and a logical "0" A1 output is provided by comparator 12 to provide a logical "1" K2 output which is fed to the direct output counter 7 to directly form a code word, as discussed heretofore. The K2 output of gate 16 will now reset counter 17 to zero and store a "three" count in counter 18. It now takes three encoder clock pulses for a logical "0" to be present on output A1 of comparator 12 and two encoder clock 2 pulses are thus "skipped". After the next logical "0" A1 output from comparator 12, three encoder clock 2 pulses will be "skipped" and so on. It should be noted that the number of encoder clock 2 pulses "skipped" during the interpulse interval between K2 output pulses is equal to the number of K2 pulses previously transmitted during the code word being formed. This process continues until either the magnitude of the reference ramp signal is either equal to or exceeds the magnitude of the input signal and the coder is reset, as discussed heretofore. The clock 2 is chosen so that only the required total number of quantizing levels is generated in the time between input samples. Thus, if the total number of levels is generated and the ramp still does not equal or exceed the input signal, the sample and hold network will reset all counters after the "all ones" code word (corresponding to the maximum level) is transmitted during the sample time.

The level elimination process may perhaps be more easily understood by a numerical illustration. For example, if the first linear chord were to be predetermined to encompass 62 encoder clock 2 pulses, then the 63rd encoder clock pulse would provide information to the output counter 7. The 64th encoder clock pulse would be "skipped" and the 65th encoder clock pulse would provide information to the output counter. The 66th and 67th encoder clock pulses would next be "skipped" and the 68th encoder clock pulse would again provide information to directly form the output word in the output counter 7. The 69th, 70th, and 71st encoder clock pulses would next be "skipped" and the 72nd encoder clock pulse would provide yet more information for the output word, and so on, with the number of encoder clock pulses "skipped" increasing by one after each K2 and D2 pulse. In other words, $n$ encoder clock pulses are "skipped" between $n$ and $n+1$ non-linear output or companded pulses, with the number of encoder clock pulses "skipped" being equal to the number of companded pulses previously transmitted to the output register. Thus, progressively less and less samples are taken at the output of the comparator as the magnitude of the reference signal is increased to its maximum value. A quantizing characteristic approaching an ideal characteristic is thereby obtained.

In summary, then, the present encoder has a companding characteristic with linear and non-linear chords intersecting at a point which is easily adjustable for any given transmission application. The encoder is a sequential coder with level elimination using all-digital circuitry with the exception of the ramp generator which may be most simply generated by analog circuitry. There is no level elimination for smaller magnitude input signals and increasing level elimination as the magnitude of the input signal increases. The output encoding word is directly formed in standard binary form in the output counter. The encoder only requires logic speeds well within the capabilities of the commercially available logic packs at the present state of the art. The simplicity of the present encoder and its low unit cost makes its use attractive for each line in transmission systems having non-synchronous lines where previously coders could not be shared without the use of buffering, timing, and gating equipment, and the cost of an individual coder for each line is prohibitive.

The above-described arrangement is illustrative of the application of the principles of the invention. Other embodiments may be devised by those skilled in the art without departing from the spirit and scope thereof.

What is claimed is:

1. An encoder comprising a comparator having a first input connected to a source of reference signal and a second input connected to receive samples of the input analog signal to be coded, an encoder clock, an output transmitting device, a linear clock connecting said encoder clock and said output transmitting device to provide a pulse to said output transmitting device for each of said encoder clock pulses until a predetermined number of pulses are transmitted from said encoder clock, a non-linear clock connecting said encoder clock and said output transmitting device after said predetermined number of encoder clock pulses are transmitted to said linear clock, the pulse output from said non-linear clock to said output transmitting device having interpulse intervals that continuously increase in a preselected progressive manner with respect to encoder clock interpulse intervals, and means connecting said linear clock and said non-linear clock to said comparator to reset said linear clock and said non-linear clock whenever the magnitude of the reference signal is equal to or exceeds the magnitude of the said samples of input signal.

2. A two-chord encoder comprising a comparator having a first input connected to a source of reference signal and a second input connected to receive samples of the input analog signal, an encoder clock, an output transmitting device, a linear chord clock connecting said encoder clock and said output transmitting device to provide a pulse to said output transmitting device for each of said encoder clock pulses until a predetermined number of encoder clock pulses are transmitted from said encoder clock, a non-linear chord companded clock connecting said encoder clock and said output transmitting device after said predetermined number of encoder clock pulses are transmitted to said linear chord clock, said non-linear chord companded clock providing a pulse output to said output transmitting device, the number of encoder clock pulses within the interpulse intervals of said non-linear clock output pulses continuously increasing in an arithmetic progression, and means connecting said linear chord clock and said non-linear companded clock to said comparator to reset said linear clock and said companded clock whenever the magnitude of the reference signal is equal to or exceeds the magnitude of the said samples of input signal.

3. A two-chord encoder in accordance with claim 2 wherein said non-linear chord companded clock comprises a second comparator having first and second counters connected thereto, means connecting said first counter to said encoder clock after said predetermined number of encoder clock pulses are transmitted to said linear chord clock, gating means connecting said comparator to said output transmitting device after said predetermined number of encoder clock pulses are transmitted to said linear chord clock to transmit said output pulses having the number of encoder clock pulses within said interpulse intervals increasing in an arithmetic progression, each of said first and second counters being connected to the output of said gating means to reset said first counter after each output pulse and advance the count by one in said second counter after each output pulse.

4. A two-chord encoder comprising a comparator having a first input connected to a source of reference signal and a second input connected to receive samples of the source of analog signal to be coded, an output transmitting device, a linear chord clock comprising first and second gating means and a first counter, said first gating means having a first input connected to said encoder clock and a second input connected to a first output of said second gating means, the output of said first gating means being connected to the input of said first counter, the outputs of said first counter being connected to the inputs of said second gating means, third gating means having a first input connected to said encoder clock and a second input connected to a second output of said second gating means, a non-linear chord companded clock comprising fourth gating means, second and third counters, and a second comparator, means connecting a first input of said fourth gating means to a first output of said third gating means, means connecting a second output of said third gating means to a first input to said second counter, means connecting the outputs of each of said second and third counters to the inputs of said second comparator, means connecting the output of said second comparator to a second input of said fourth gating means to provide a companded pulse output which progressively decreases with respect to the rate of the pulses from said encoder clock to said first input of said third gating means, means connecting a first output of said fourth gating means to said second and third counters to reset said second counter and increase the count stored in said third counter by one, fifth gating means having a first input connected to the output of said first gating means and a second input connected to a second output of said fourth gating means, a first output of said fifth gating means being connected to said output transmitting device to form the desired output binary word directly in said output transmitting device, and sixth gating means having a first input connected to a second output of said fifth gating means and a second input connected to the output of said comparator, the output of said sixth gating means being connected to said source of reference signal, said output transmitting device, and said first, second, and third counters to reset said first, second, and third counters each time the reference signal is equal to or exceeds said samples of the input signal.

* * * * *